United States Patent [19]
Hirschfeld

[11] Patent Number: 5,443,189
[45] Date of Patent: Aug. 22, 1995

[54] ARTICLE MOUNTING ASSEMBLY FOR A VEHICLE MOUNTED CARRIER

[76] Inventor: Ernest Hirschfeld, 1032-108 Street, Edmonton, Alberta, Canada, T6J 6M2

[21] Appl. No.: 329,496
[22] Filed: Oct. 26, 1994
[51] Int. Cl.⁶ .................................................. B60R 9/10
[52] U.S. Cl. ................................. 224/501; 224/282; 224/504; 224/506; 224/507; 224/510; 224/521; 224/532; 224/537; 224/536; 224/917.5; 224/924
[58] Field of Search ............... 224/281, 282, 42.03 R, 224/42.04, 42.06, 42.07, 42.08, 42.03 B, 42.38, 45.45 R

[56] References Cited

U.S. PATENT DOCUMENTS

| | | | |
|---|---|---|---|
| 2,803,349 | 8/1957 | Talbot | 224/42.03 B |
| 4,057,182 | 11/1977 | Kolkhorst et al. | 224/42.45 R |
| 4,089,448 | 5/1978 | Traeger | 224/42.03 B |
| 4,562,575 | 12/1985 | Jones | 224/42.21 |
| 4,635,835 | 1/1987 | Cole | 224/42.08 |
| 4,640,658 | 2/1987 | Webb, Jr. | 414/462 |
| 4,676,414 | 6/1987 | Deguevara | 224/42.03 |
| 4,871,103 | 10/1989 | Martinsson | 224/310 |
| 4,971,237 | 11/1990 | Davis | 224/282 |
| 5,004,133 | 4/1991 | Wyers | 224/42.03 B |
| 5,067,641 | 11/1991 | Johnson et al. | 224/42.03 B |
| 5,094,373 | 3/1992 | Lovci | 224/282 |
| 5,096,102 | 3/1992 | Tolson | 224/42.45 R |
| 5,181,822 | 1/1993 | Allsop et al. | 414/462 |
| 5,190,195 | 3/1993 | Fullhaut et al. | 224/42.45 R |
| 5,244,133 | 9/1993 | Abbott et al. | 224/42.03 B |
| 5,330,084 | 7/1994 | Peters | 224/42.45 R |
| 5,385,280 | 1/1995 | Littlepage et al. | 224/42.45 R |

Primary Examiner—Henry J. Recla
Assistant Examiner—Gregory M. Vidovich
Attorney, Agent, or Firm—Anthony R. Lambert

[57] ABSTRACT

An improved article mounting assembly for a vehicle mounted carrier is described. This particular style of vehicle mounted carrier has an upright primary support member with a bottom end adapted for attachment to a square tube trailer hitch on a vehicle and a top end having means to secure articles to the primary support member. The improvement includes a tubular primary upright support member having a top end, a bottom end and an interior bore. A lower mounting member is provided having a first portion and a tubular second portion. The first portion has article receiving depressions. The second portion has having an interior bore that telescopically receives the top end of the primary support member. A stop is provided to limit the relative telescopic movement of the tubular second portion of the lower mounting member and the primary support member. An upper mounting member is provided having a first portion and a second portion. The first portion has article receiving depressions that cooperate with the article receiving depressions of the lower mounting portion. The second portion is telescopically received in the interior bore of the primary support member. A lock mechanism is provided to lock the second portion in relative telescopic position within the primary support member.

11 Claims, 5 Drawing Sheets

ARTICLE MOUNTING ASSEMBLY FOR A VEHICLE MOUNTED CARRIER

FIELD OF THE INVENTION

The present invention relates to vehicle mounted carriers having an upright primary support member with a bottom end adapted for attachment to a square tube trailer hitch on a vehicle and a top end having means to secure articles to the primary support member.

BACKGROUND OF THE INVENTION

Most vehicle mounted carriers are intended to transport a particular article. For this reason, patents relating to vehicle mounted carriers are usually titled as bicycle carriers, tire carriers, ski carriers and the like. As one might expect, the bicycle carriers are not particularly suited for carrying skis, and vice versa.

SUMMARY OF THE INVENTION

What is required is a vehicle mounted carrier that can be used for a wide variety of articles.

According to the present invention there is provided an improved article mounting assembly for a vehicle mounted carrier. This particular style of vehicle mounted carrier has an upright primary support member with a bottom end adapted for attachment to a square tube trailer hitch on a vehicle and a top end having means to secure articles to the primary support member. The improvement includes a tubular primary upright support member having a top end, a bottom end and an interior bore. A lower mounting member is provided having a first portion and a tubular second portion. The first portion has article receiving means. The second portion has an interior bore that telescopically receives the top end of the primary support member. Stop means are provided to limit the relative telescopic movement of the tubular second portion of the lower mounting member and the primary support member. An upper mounting member is provided having a first portion and a second portion. The first portion has article receiving means that cooperate with the article receiving means of the lower mounting portion. The second portion is telescopically received in the interior bore of the primary support member. Lock means are provided to lock the second portion in relative telescopic position within the primary support member.

The vehicle mounted carrier, as described above, is extremely versatile. The primary support member can be mounted at the rear of a vehicle with the lower and upper mounting members oriented away from the vehicle, toward the vehicle, to the left side of the vehicle or to the right side of the vehicle. When cylindrical tubing is used, there is a risk of the lower mounting member rotating relative to the primary support member. This problem can be avoided when the top end of the primary upright support member and the second portion of the lower mounting member are both fabricated from square tubing.

The upper mounting member and the lower mounting member can be spaced whatever distance apart is necessary to hold the article securely. They can also be formed in a variety of compatible shapes. It is preferred, however, that the lower mounting member is a generally "L" shaped bracket with the article receiving means on the first portion including a plurality of arcuate depressions. It is, similarly, preferred that the upper mounting member is a generally "L" shaped bracket with the article receiving means on the first portion including a plurality of arcuate depressions.

Although beneficial results may be obtained through the use of the improved article mounting assembly for a vehicle mounted carrier as defined above, it is sometimes a problem getting a profile for one set of depressions that will accommodate a wide variety of articles. Even more beneficial results may be obtained when a generally planar resilient deformable gasket extends along the first portion of the lower mounting member and the first portion of the upper mounting member. A gasket, as described, tends to deform to conform to the shape of an article inserted into one of the arcuate depressions.

There are a variety of stop means that can be used. The one that is preferred involves positioning an inwardly projecting flange in the interior bore of the lower mounting member which engages a top peripheral edge of the primary upright support member. There are, similarly, a variety of lock means that can be used. The one that is preferred involves positioning an inclined plane wedge member at a lower end of the second portion of the upper mounting member. A bolt is provided having a head positioned at a top end of the second portion of the upper mounting member and a lower end engaging the inclined plane wedge member. The inclined plane wedge member is movable into a locking position by rotation of the bolt.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
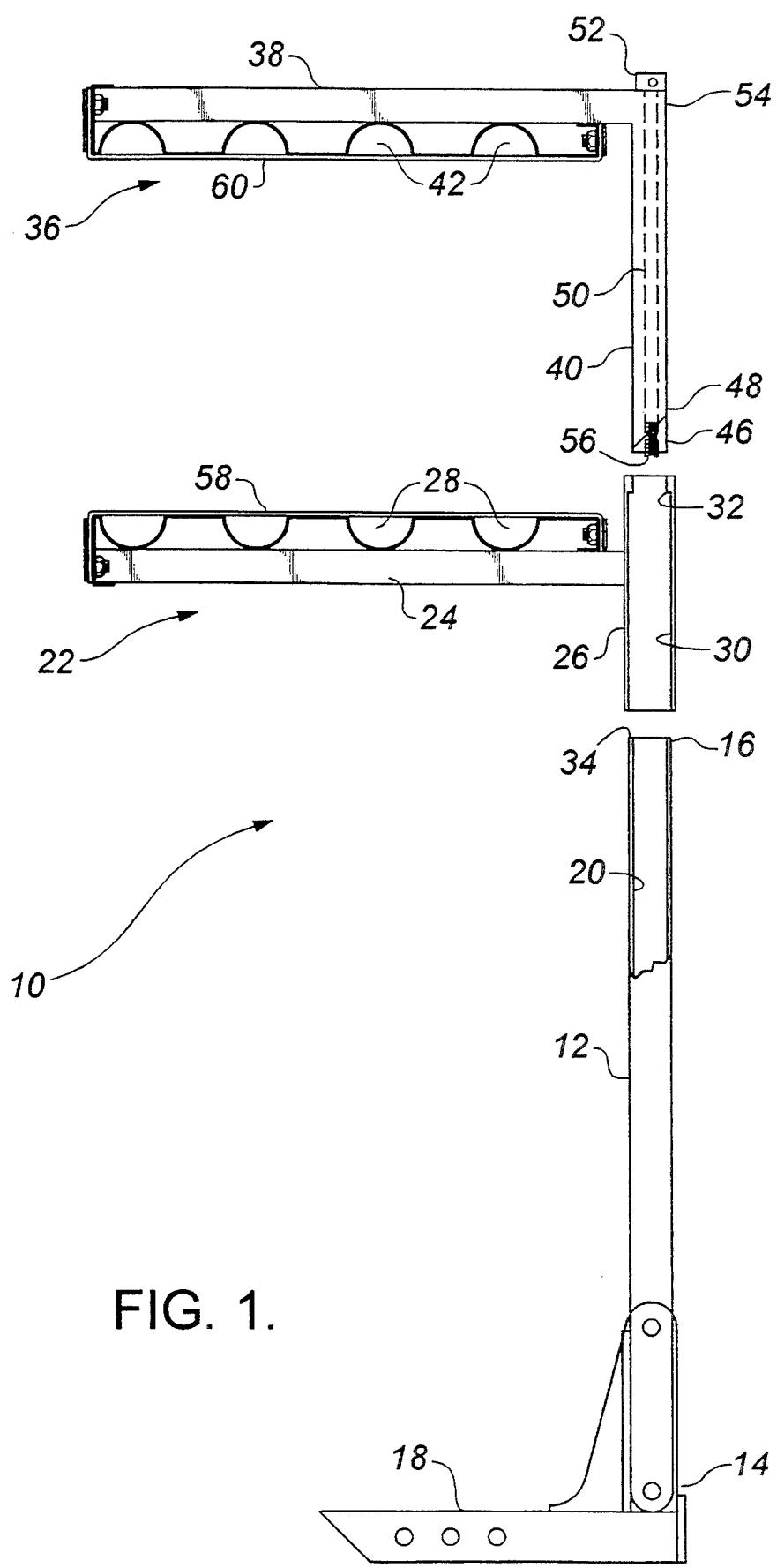
FIG. 1 is an exploded side elevation view of an improved article mounting assembly for a vehicle mounted carrier constructed in accordance with the teachings of the present invention.

The preferred embodiment, an article mounting assembly for a vehicle mounted carrier generally identified by reference numeral 10, will now be described with reference to FIGS. 1 through 7.

Referring to FIG. 1, there is illustrated an upright primary support member 12 with a bottom end 14 and a top end 16. Bottom end 14 has an adaptor 18 which is intended for insertion into a square tube trailer hitch on a vehicle. Top end 16 has means to secure articles to primary support member 12, which serve as the subject matter of this invention.

Figure 2:
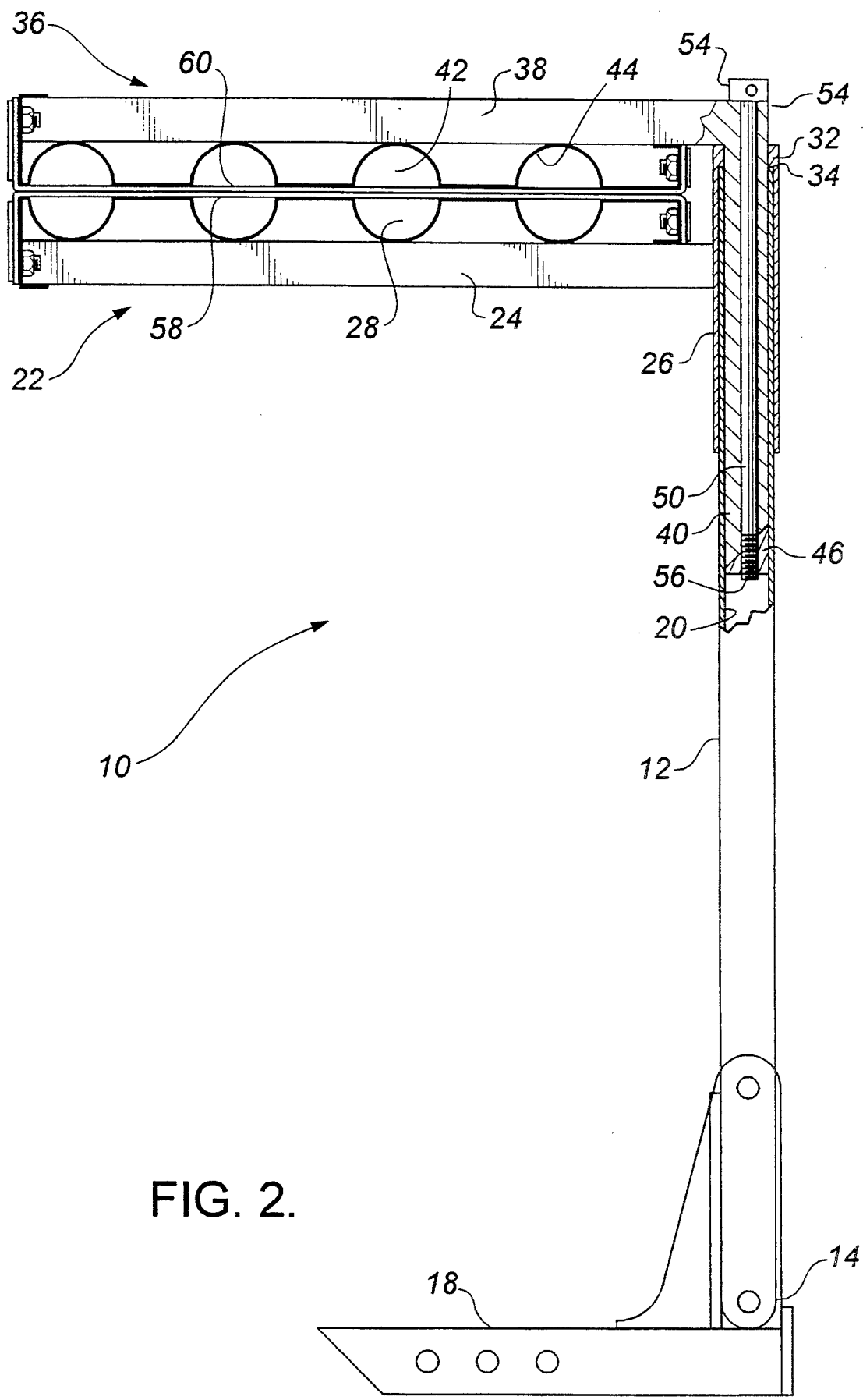
FIG. 2 is a side elevation view of the article mounting assembly illustrated in FIG. 1.
Figure 7:
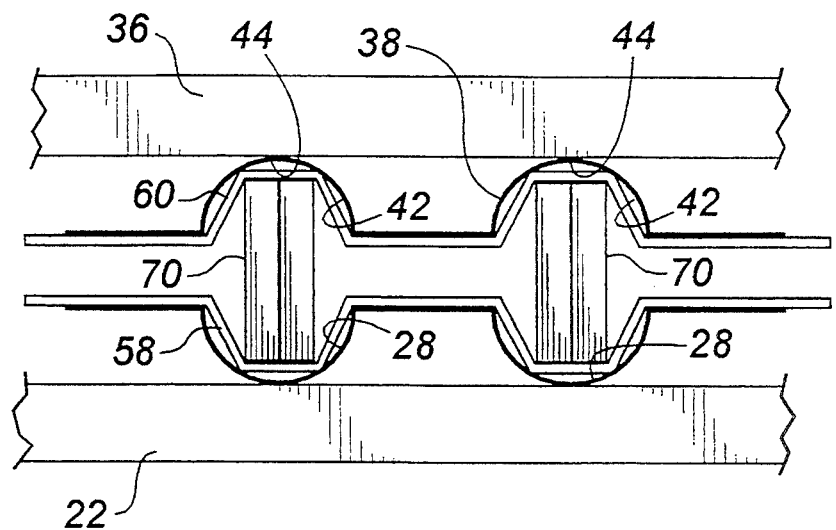
FIG. 7 is a detailed side elevation view of a gasket portion of the article mounting assembly illustrated in FIG. 1.
Figure 8:
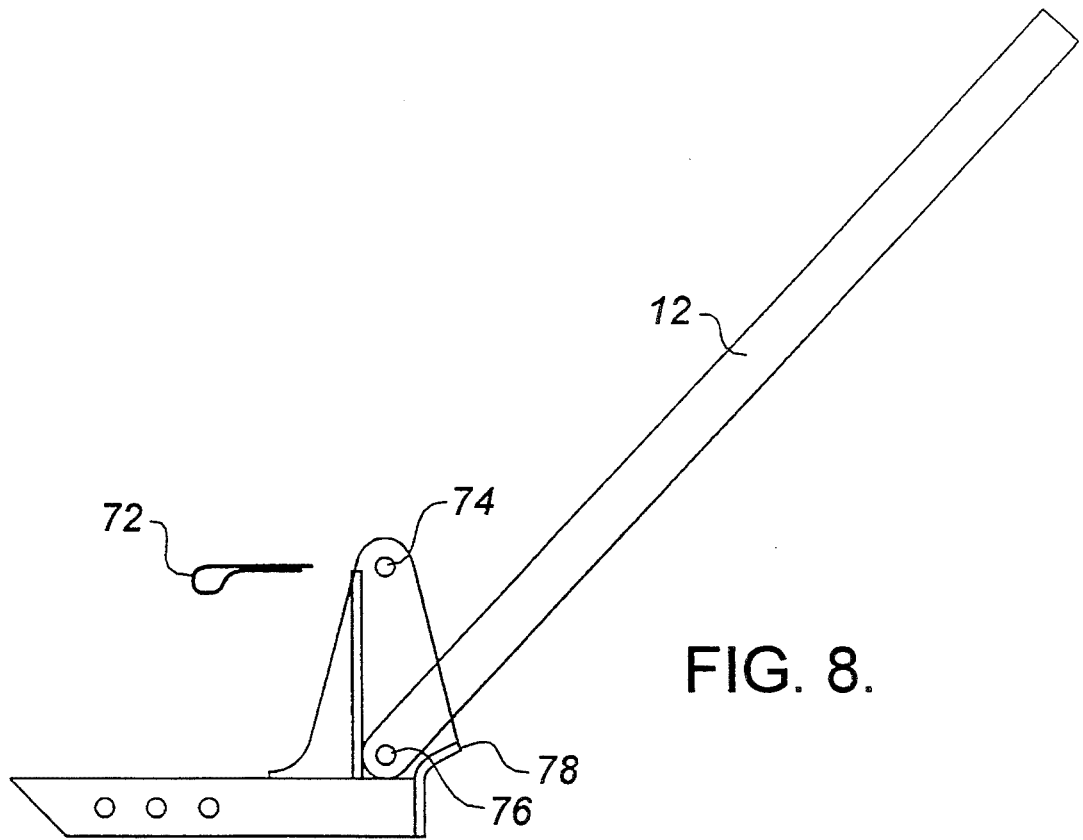
FIG. 8 is a detailed side elevation view of a primary upright support member of the article mounting assembly illustrated in FIG. 1.

Referring to FIG. 2, in accordance with the present invention top end 16 of primary support member 12 is fabricated from tubing and, as such, has an interior bore 20. It is preferred that the tubing be square. Referring to FIG. 1, a generally "L" shaped lower mounting member 22 is provided having a first portion 24 and a second portion 26. First portion 24 extends substantially horizontally and has a plurality of arcuate article receiving depressions 28. Second portion 26 is also fabricated from square tubing and has an interior bore 30. Interior bore 30 telescopically receives top end 16 of primary support member 12. An inwardly projecting flange 32 in interior bore 30 of lower mounting member 22 engages a top peripheral edge 34 at top 16 of primary support member 12 to limit the relative telescopic movement of second portion 26 of lower mounting member 22 and primary support member 12. A generally "L" shaped upper mounting member 36 is provided having a first portion 38 and a second portion 40. First portion 38 extends substantially horizontally and has a plurality of arcuate article receiving depressions 42. Arcuate article receiving depressions 42 of upper mounting member 36 cooperate with arcuate article receiving depressions 28 of lower mounting member 22 to form generally circular article receiving cavities, generally indicated in FIG. 2 by reference numeral 44. Second portion 40 of upper mounting member 36 is telescopically received in interior bore 20 of primary support member 12, as illustrated in FIG. 2. An inclined plane wedge member 46 is positioned at a lower end 48 of second portion 40 of upper mounting member 36. Lower end 48 of second portion 40 of upper mounting member is inclined at an angle. A bolt 50 extends through upper mounting member 36. Bolt 50 has a head 52 positioned at an upper end 54 of second portion 40 and a lower end 56 engaging inclined plane wedge member 46. Inclined plane wedge member 46 is movable by rotation of bolt 50 to lock second portion 40 in relative telescopic position within interior bore 20 of primary support member 12. A first generally planar resilient deformable rubber gasket 58 extends along first portion 24 of lower mounting member 22. A second generally planar resilient deformable rubber gasket 60 extends along first portion 38 of upper mounting member 36 parallel to first deformable gasket 58. Referring to FIG. 7, gaskets 58 and 60 deform to conform to the shape of an article 70 inserted into one of circular article receiving cavities 44. In this case, article 70 is a pair of skiis. Referring to FIG. 8, it can be seen that primary support member 12 is pivotally mounted at bottom end 14 to adaptor 18. When cotter pin 72 is pulled out of aperture 74 primary support member 12 pivots about a horizontal axis defined by pivot pin 76. This feature allows bicycles to be set onto the ground during loading and unloading, and allows improved access to the rear or trunk area of the vehicle when vehicle mounted carrier 10 is in place. An underlying lip 78 projects from adaptor 18 and serves as stop means to limit pivotal movement of primary support member 12.

Figure 3:
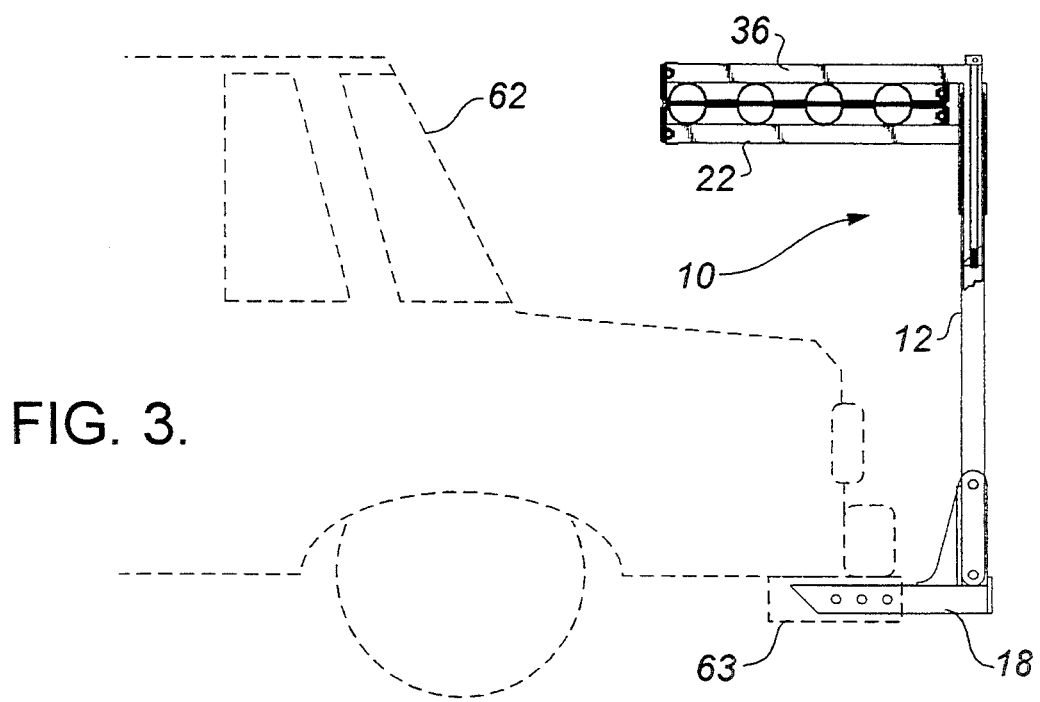
FIG. 3 is a side elevation view of the article mounting assembly illustrated in FIG. 1, mounted on a vehicle with the lower and upper mounting members positioned toward the vehicle.
Figure 4:
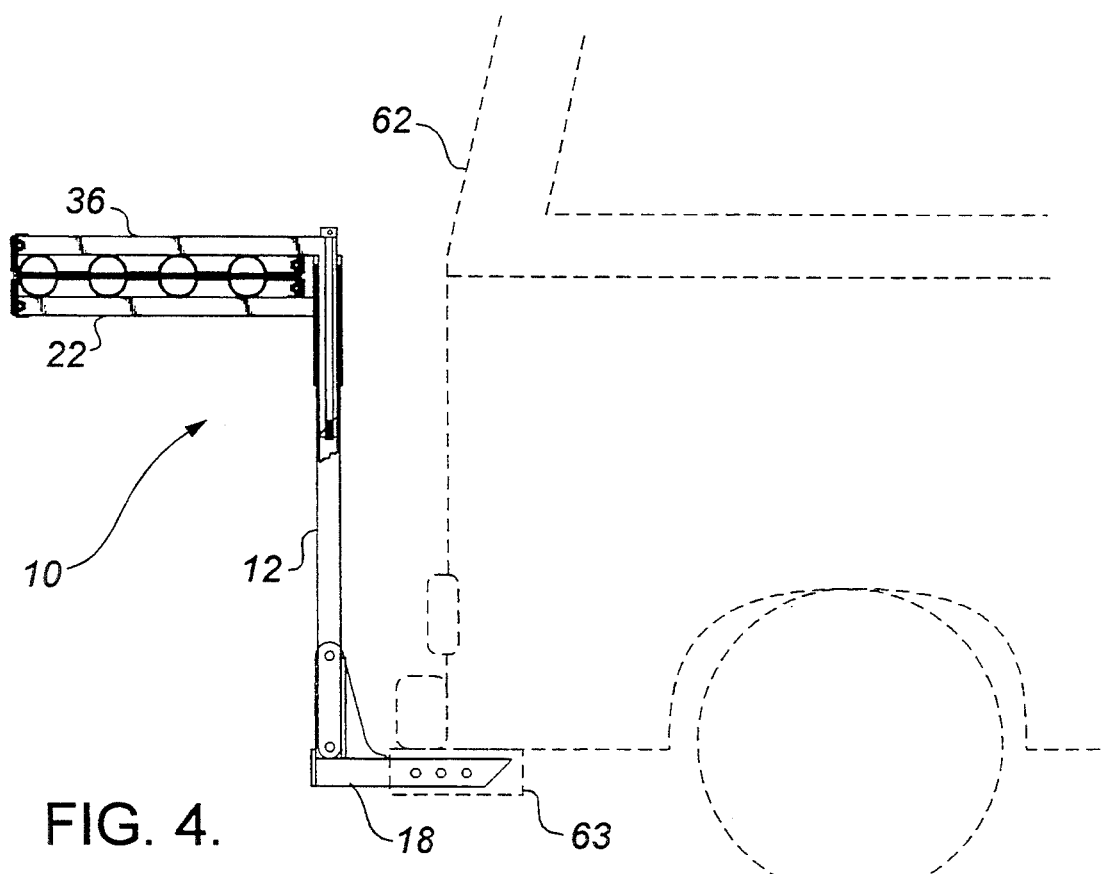
FIG. 4 is a side elevation view of the article mounting assembly illustrated in FIG. 1, mounted on a vehicle with the lower and upper mounting members positioned away from the vehicle.
Figure 5:
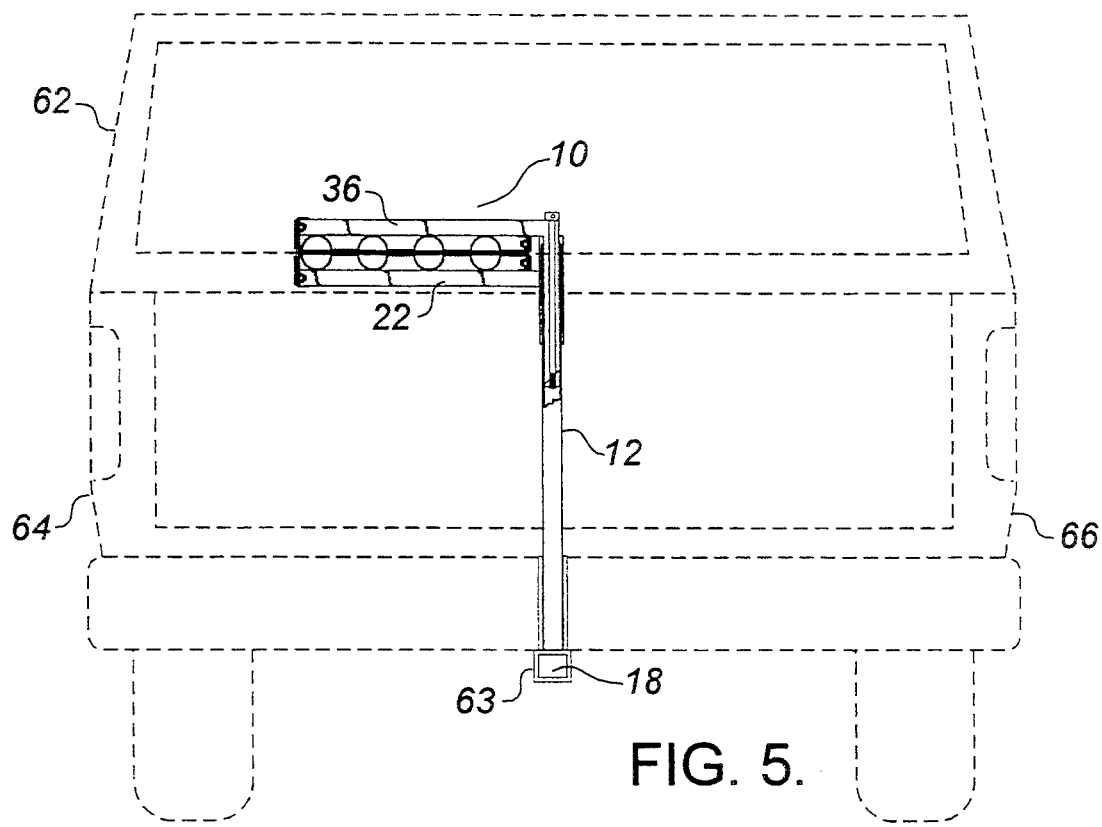
FIG. 5 is a rear elevation view of the article mounting assembly illustrated in FIG. 1, mounted on a vehicle with the lower and upper mounting members positioned toward the left side of the vehicle.
Figure 6:
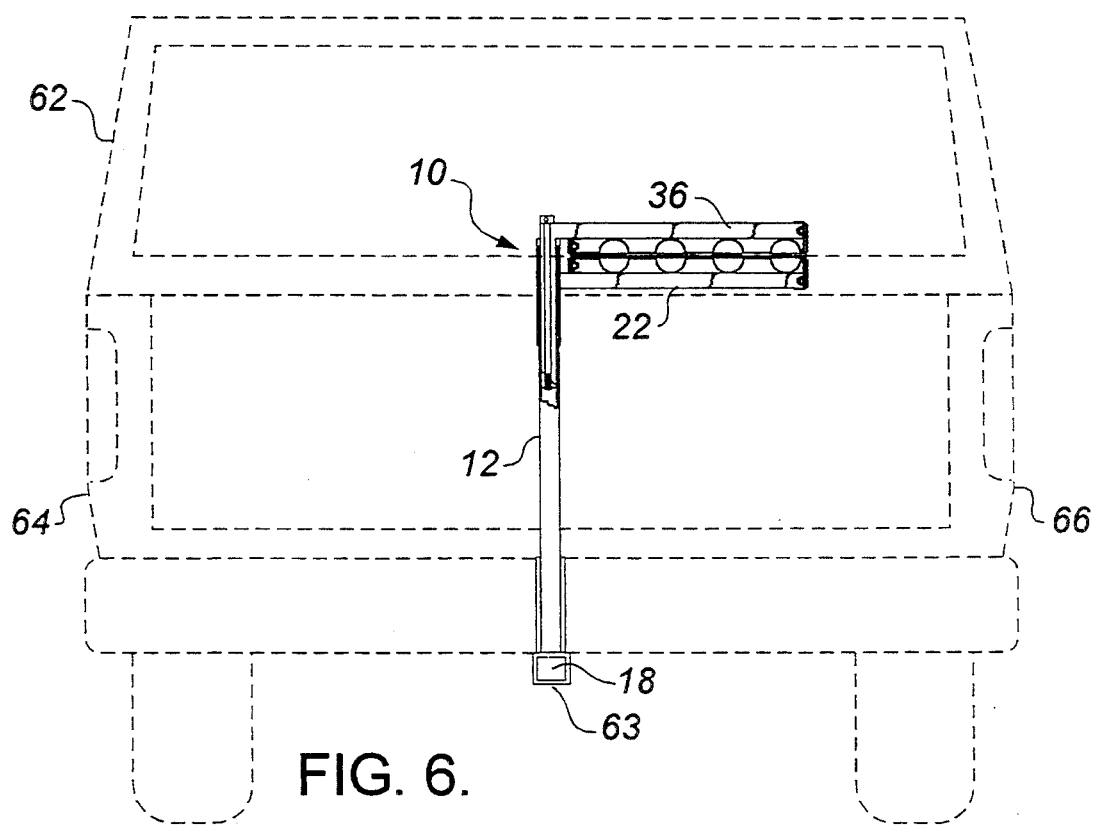
FIG. 6 is a rear elevation view of the article mounting assembly illustrated in FIG. 1, mounted on a vehicle with the lower and upper mounting members positioned toward the right side of the vehicle.

The use and operation of vehicle mounted carrier 10 will now be described with reference to FIGS. 1 through 7. Referring to FIGS. 3 through 6, vehicle mounted carrier 10 is secured to a vehicle 62 by inserting adaptor 18 into a square tube trailer hitch 63. When this is done primary support member 12 is positioned vertically behind vehicle 62. The versatility of vehicle mounted carrier 10 lies in the article mounting assembly, as previously described. Referring to FIGS. 1 and 2, lower mounting member 22 is positioned onto primary mounting member 12 inserting top 16 of primary mounting member 12 into interior bore 30 of second portion 26 until top peripheral edge 34 engages inwardly projecting flange 32. Referring to FIG. 3 lower mounting member 22 can be positioned toward vehicle 62. Referring to FIG. 4, lower mounting member 22 can be positioned extending away from vehicle 62. Referring to FIG. 5, lower mounting member 22 can be positioned toward a left side 64 of vehicle 62. Referring to FIG. 6 lower mounting member 22 can be positioned toward a right side 66 of vehicle 62. This difference in orientation is very important, as it enables the space requirements of different articles to be accommodated. In addition, the needs of various vehicles can be accommodated. For example, a vehicle with a rearwardly facing door requires lower mounting member 22 to be positioned to either left side 64 or right side 66 in order to permit the door to be opened. Once lower mounting member 22 is in position on primary support member 12, an article 70 can be positioned in arcuate article receiving depressions 28, as illustrated in FIG. 7. Of course, article 70 might not maintain its position if vehicle 62 were set in motion, so upper mounting member 36 is positioned onto primary support member 12. Article 70 is prevented from coming out of depressions 28 of lower mounting member 22 by upper mounting member 36. As previously described, arcuate article receiving depressions 42 of upper mounting member 36 cooperate with arcuate article receiving depressions 28 of lower mounting member 22 to form generally circular article receiving cavities 44. Referring to FIGS. 1 and 2, upper mounting member 36 is positioned on primary support member 12 by inserting second portion 40 of upper mounting member 36 into interior bore 20 of primary support member 12, as illustrated in FIG. 2. Inclined plane wedge member 46 is then used to lock upper mounting member 36 in position. In order to tighten inclined plane wedge member 46 a tool is placed upon head 52 of bolt 50, and bolt 50 is rotated. The rotation of bolt 50 results in inclined plane wedge member 46 rotating in relation to lower inclined end 48 of second portion 40 of upper mounting member 36, until inclined plane wedge member 46 and lower inclined end 48 turn sufficiently to wedge second portion 40 of upper mounting member within interior bore 20 of primary support member 12. Referring to FIG. 7, when article 70 is not arcuate in shape, gaskets 58 and 60 deform to conform to the actual shape of article 70, thereby adapting circular article receiving cavities 44 to the required shape. Referring to FIG. 8, when access to the rear or trunk area of the vehicle is required primary support member 12 can be pivoted out of the way by pulling cotter pin 72 out of aperture 74 and pivoting primary support member 12 about a horizontal axis defined by pivot pin 76.

It will be apparent to one skilled in the art that modifications may be made to the illustrated embodiment without departing from the spirit and scope of the invention as defined by the claims.

The embodiments of the invention in which an exclusive property or privilege is claimed are as follows:

1. In an article mounting assembly for a vehicle mounted carrier having a tubular upright primary support member with a bottom end adapted for attachment to a square tube trailer hitch on a vehicle and a top end having means to secure articles to the primary support member, the improvement comprising:

said tubular primary upright support member having an interior bore substantially parallel to the length of said support member and extending from said top end;

a lower mounting member having a first portion and a tubular second portion, the first portion having article receiving means, the second portion having an interior bore that telescopically receives the top end of the primary support member, stop means being provided to limit the relative telescopic movement of the tubular second portion of the lower mounting member and the primary support member; and an upper mounting member having a first portion and a second portion, the first portion of said upper mounting member having article receiving means that cooperate with the article receiving means of the lower mounting portion such that an article is adapted to be held securely therebetween, the second portion of said upper mounting member being telescopically received in the interior bore of the primary support member, lock means being provided to lock the second portion of said upper mounting member in relative telescopic position within the interior bore of the primary support member.

2. In the article mounting assembly for the vehicle mounted carrier as defined in claim 1, wherein the top end of the primary upright support member and the second portion of the lower mounting member are both fabricated from square tubing.

3. In the article mounting assembly for the vehicle mounted carrier as defined in claim 1, wherein the lower mounting member is a generally "L" shaped bracket with the article receiving means on the first portion of the lower mounting member including a plurality of arcuate depressions.

4. In the article mounting assembly for the vehicle mounted carrier as defined in claim 1, wherein the upper mounting member is a generally "L" shaped bracket with the article receiving means on the first portion of the upper mounting member including a plurality of arcuate depressions.

5. In the article mounting assembly for the vehicle mounted carrier as defined in claim 3, wherein a generally planar resilient deformable gasket extends along the first portion of the lower mounting member, such that the gasket deforms to conform to the shape of the article secured to one of the arcuate depressions.

6. In the article mounting assembly for the vehicle mounted carrier as defined in claim 4, wherein a generally planar resilient deformable gasket extends along the first portion of the upper mounting member, such that the gasket deforms to conform to the shape of the article secured to one of the arcuate depressions.

7. In the article mounting assembly for the vehicle mounted carrier as defined in claim 1, wherein the stop means is an inwardly projecting flange in the interior bore of the lower mounting member which engages a top peripheral edge of the primary upright support member.

8. In the article mounting assembly for the vehicle mounted carrier as defined in claim 1, wherein the lock means is an inclined plane wedge member at a lower end of the second portion of the upper mounting member, a bolt having a head positioned at an upper end of the second portion of the upper mounting member and a lower end engaging the inclined plane wedge member such that the inclined plane wedge member is movable into a locking position by rotation of the bolt.

9. In the article mounting assembly for the vehicle mounted carrier as defined in claim 1, wherein the bottom end of the primary upright support member is pivotally mounted for pivotal movement about a substantially horizontal axis to an adaptor insertable into the square tube trailer hitch on the vehicle, means being provided to lock the primary upright support member to the adaptor in a substantially vertical position.

10. In an article mounting assembly for a vehicle mounted carrier having a tubular upright primary support member with a bottom end adapted for attachment to a square tube trailer hitch on a vehicle and a top end having means to secure articles to the primary support member, the improvement comprising:

said primary upright support member having an interior bore substantially parallel to the length of said support member and extending from said top end, the top end of the primary upright support member being fabricated from square tubing;

a generally "L" shaped lower mounting member having a first portion and a second portion, the second portion being fabricated from square tubing, the first portion having a plurality of article receiving arcuate depressions, the second portion having an interior bore that telescopically receives the top end of the primary support member, an inwardly projecting flange in the interior bore of the lower mounting member engages a top peripheral edge of the primary upright support member to limit the relative telescopic movement of the second portion of the lower mounting member and the primary support member;

a generally "L" shaped upper mounting member having a first portion and a second portion, the first portion of said upper mounting member having a plurality of article receiving arcuate depressions that cooperate with the article receiving arcuate depressions of the lower mounting member to form generally circular article receiving cavities, the second portion of said upper mounting member being telescopically received in the interior bore of the primary support member, an inclined plane wedge member at a lower end of the second portion of the upper mounting member, a bolt having a head positioned at an upper end of the second portion of the upper mounting member and a lower end engaging the inclined plane wedge member such that the inclined plane wedge member is movable by rotation of the bolt to lock the second portion of the upper mounting member in relative telescopic position within the interior bore of the primary support member.

11. In the article mounting assembly for the vehicle mounted carrier as defined in claim 10, wherein a first generally planar resilient deformable gasket extends along the first portion of the lower mounting member and a second generally planar resilient deformable gasket extends along the first portion of the upper mounting member parallel to the first deformable gasket, such that the gaskets deforms to conform to the shape of an article inserted into one of the circular article receiving cavities.

* * * * *